United States Patent [19]

Islam

[11] Patent Number: 4,995,690
[45] Date of Patent: Feb. 26, 1991

[54] MODULATION INSTABILITY-BASED FIBER INTERFEROMETRIC SWITCH

[76] Inventor: Mohammed N. Islam, 49 Cresci Blvd., Hazlet, N.J. 07730

[21] Appl. No.: 342,271

[22] Filed: Apr. 24, 1989

[51] Int. Cl.⁵ .......................... G02B 6/26; G02B 6/10; G02F 1/03
[52] U.S. Cl. ................................ 350/96.15; 350/356; 350/96.13
[58] Field of Search ............... 350/96.15, 96.16, 96.29, 350/356; 455/610, 612

[56] References Cited

U.S. PATENT DOCUMENTS

| | | | |
|---|---|---|---|
| 4,255,017 | 3/1981 | Hasegawa | 350/96.15 X |
| 4,741,587 | 5/1988 | Jewell et al. | 350/96.15 |
| 4,761,050 | 8/1988 | Byron | 350/96.15 |
| 4,772,083 | 9/1988 | Ahmed | 350/96.14 |

OTHER PUBLICATIONS

A. Hasegawa et al., *Appl. Phys. Lett.*, vol. 23, No. 3, Aug. 1, 1973, "Transmission of Stationary Nonlinear . . . ", pp. 142–144.
L. F. Mollenauer et al., *Phys. Rev. Letts.*, vol. 45, No. 13, Sep. 29, 1980, "Experimental Observation of Picosecond . . . ", pp. 1095–1098.
K. Tai et al., *Appl. Phys. Lett.*, vol. 49, No. 5, Aug. 4, 1986, "Generation of Subpicosecond Solitonlike Optical . . . ", pp. 236–238.
M. Shirasaki et al., Conf. Lasers & Electro-Optics, 1987, "A Nonlinear Fiber Interferometer . . . ", pp. 187–187g.
I. H. White et al., *Electronics Letters*, vol. 24, No. 6, Mar. 17, 1988, "Demonstration of the Optical Kerr Effect . . . ", pp. 340–341.
S. P. Shipley, *Electronics Letters*, vol. 24, No. 8, Apr. 14, 1988, "All-Single-Mode-Fibre Interferometric Polarisation . . . ", pp. 478–479.
M. N. Islam et al., *Optics Letters*, vol. 13, No. 6, Jun. 1988, "Modulation-Instability-Based Fiber . . . ", pp. 518–520.
R. V. Penty et al., *Electronics Letters*, vol. 24, No. 21, Oct. 13, 1988, "Nonlinear, Two-Moded, Single-Fibre, . . . ", pp. 1338–1339.

*Primary Examiner*—William L. Sikes
*Assistant Examiner*—Akm E. Ullah

[57] ABSTRACT

High incremental gain and ultrafast switching operation are achieved in a fiber interferometer switch by employing a control optical signal in one arm of the interferometer and a pump optical signal split between both arms of the interferometer wherein signal frequencies are in the anomalous group velocity dispersion region of only one arm of the fiber interferometer to cause modulation instability to occur. Net gain in excess of $10^4$ has been observed where net gain is the ratio of device output peak power to control signal input power. In a preferred embodiment of the invention, the interferometer is a balanced Mach-Zehnder interferometer utilizing a single mode, dispersion shifted, polarization-preserving optical fiber.

16 Claims, 4 Drawing Sheets

MODULATION INSTABILITY-BASED FIBER INTERFEROMETRIC SWITCH

TECHNICAL FIELD

The present invention is related to optical devices and more particularly to the ultrafast optical switching devices.

BACKGROUND OF THE INVENTION

All optical-photonic switching and signal processing devices are being developed to exploit speed and bandwidth advantages of fiber optics. These devices are divisible into two distinct categories: highly parallel devices for complex tasks that may be relatively slow such as data array manipulation, and ultrafast simple devices for serial processing applications such as front-/back end communications processing.

For ultrafast applications, optical fibers present an attractive medium in which to perform switching. Fibers have a very short response time for the nonlinearity and have a very low absorption coefficient.

In addition to providing high speed, it is also necessary to have incremental or small-signal gain. Devices which exhibit such incremental gain have been important to various switching, computing and signal processing applications. In a classical example, the incremental gain of transistors permits relatively small signals to control other much larger input signals, By providing incremental gain, it is possible to cascade devices so that one output may be fanned-out to several inputs. These devices have been somewhat harder to obtain in the optical domain.

Recently for optical devices, it was shown that a nonlinear fiber interferometer possesses the ability to operate as a switching device with some incremental gain. See S. Shirasaki et al., *Proceedings of CLEO 1987*, page 187. Shirasaki et al. designed a single fiber interferometer in which two mutually orthogonal polarized versions of the same probe pulse are delayed with respect to each other and interfere under control of a cotraveling control pulse. The fiber is standard circular core optical fiber. The control pulse changes the index seen by the people pulse so that the polarization of the probe pulse is changed upon recombination. Shirasaki et al. rely upon the nonlinear index, $n_2$, in the fiber to provide gain for the device. However, this arrangement is severely limited in the amount of gain it can possibly achieve because it requires the power in the control signal to be substantially equal to the power in the switched probe signal to achieve significant output power.

SUMMARY OF THE INVENTION

High incremental gain, and ultrafast switching operations are achieved in a fiber interferometer switch by employing a control optical signal in one arm of the interferometer and a pump optical signal split between both arms of the interferometer wherein signal frequencies are in the anomalous group velocity dispersion region of only one arm of the fiber interferometer to cause modulation instability to occur. Modulation instability contributes to the high incremental gain because of the unique interplay resulting between the nonlinear index of the fiber and the anomalus group velocity dispersion of the fiber. Net gain in excess of $10^4$ has been observed where net gain is the ratio of device output peak power to control signal input power.

In a preferred embodiment of the invention, the interferometer is a balanced Mach-Zehnder interferometer utilizing a single mode, dispersion shifted, polarization-preserving optical fiber.

BRIEF DESCRIPTION OF THE DRAWING

A clearer understanding of the present invention may be developed by reading the description which follows together with the drawing in which.

DETAILED DESCRIPTION

A fiber interferometer device in accordance with the teachings herein is applicable to switching operations and has the potential for being cascadable. As such, the device is useful for fiber-based communication and signals processing applications as well as for optical computing and neural networks. The attractiveness of the present invention is increased by the fact that all fiber components may be employed to realize the switching device.

In operation, the device exhibits high incremental gain. That is, a low power input signal controls a much higher power signal. The high incremental gain originates from modulation instability or parametric amplification resulting from quasi-CW lightwave signals propagating at a wavelength in the anomalous dispersion region of a transmision medium such as an optical fiber. Modulation instability is a nonlinear process in which amplitude and phase modulations of a wave grow due to an interplay between the nonlinearity of the refractive index and the anomalous group velocity dispersion. Modulation instability is the tendency of a broad pulse to break up into a train of narrower pulses called solitons. Modulation instability deepens the modulation depth of an input lightwave in the transmission medium so that the wave develops a sinusoidal-like shape. Subsequently, each period of the wave undergoes high order soliton compression to form a train of well separated pulses. The rising portion of the input lightwave is red-shifted due to self-phase modulation so that the rising portion is effectively slowed with respect to the falling portion of the lightwave signal. The falling portion of the lightwave signal is blue-shifted because of the anomalous group velocity dispersion. For a more detailed explanation of these processes, see *Appl. Phys. Lett.*, 49(5), pp. 236-8 (1986); *Appl. Phys. Lett.*, 23(3), pp. 142-4 (1973); and *Phys. Rev. Lett.*, Vol. 45, No. 13, pp. 1095-8 (1980).

Figure 1:
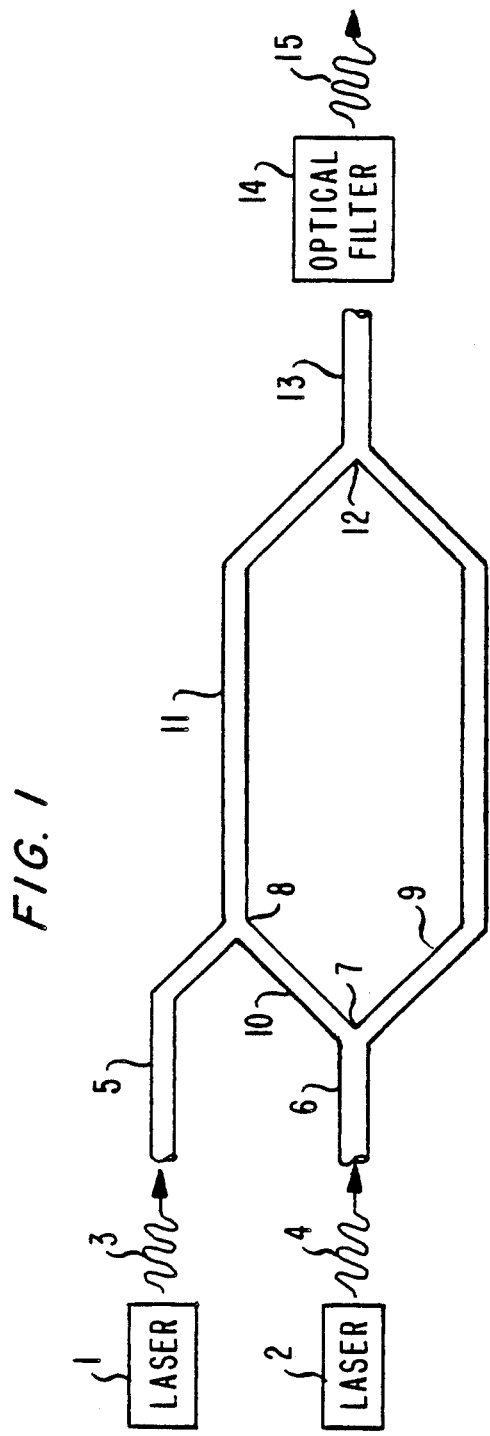
FIGS. 1 and 2 shown schematic diagrams of different Mach-Zehnder interferometers in accordance with the principles of the invention.

As shown in FIG. 1, the present switch employs a balanced interferometer configuration. A desirable result from using the interferometer configuration is that fluctuations in the controlled signal are effectively cancelled. The two fiber Mach-Zehnder interferometer shown in FIG. 1 is meant to be for illustrative purposes. Equivalent interferometer configurations which have the desired characteristics of the present switch may be realized for example, with a single branch supporting two orthogonal polarizations.

In a standard Mach-Zehnder interferometer, an input lightwave signal is divided between two wavelengths whose propagation constants for guided modes are modulated differently to produce a desired effect. For example, light is injected into an input waveguide down which it propagates until the light is divided between two branch waveguides by a beam splitting Y-branch. The propagation constants for one or both waveguide branches are modulated to achieve a desired change in the relative phase difference between guided modes of the light when they coupled into an output waveguide by a recombining Y-branch.

As shown in FIG. 1, the Mach-Zehnder interferometer switch comprises input fibers 5 and 6, beam splitting Y-branch 7, coupler 8, interferometer arm fibers 9, 10 and 11, beam combining Y-branch 12, and output fiber 13. Also shown with the Mach-Zehnder interferometer switch are control laser 1 generating optical control signal 3, pump laser 2 generating optical pump signal 4, and optical filter 14.

The Mach-Zehnder interferometer switch is realized with standard optical fibers and preferably with fiber beam splitters, recombiners and couplers. For those person skilled in the art, recombiners and couplers are substantially identical elements whereas beam splitters may be realized as reversed couplers providing the necessary degree of beam splitting such as 50% to each arm. Input fiber 5 is connected to the input side of beam splitting Y-branch 7. Outputs from the legs of the Y in beam splitting Y-branch are connected to interferometer arm filters 9 and 10. Fiber 9 comprises the lower propagation path or arm of the Mach-Zehnder interferometer switch. The upper propagation path or arm of the Mach-Zehnder interferometer includes fibers 10 and 11. Interferometer arm fiber 10 and input fiber 5 are connected to the input side of coupler 8 which combines two signals onto one output signal. As shown, the output of coupler 8 is connected to interferometer arm fiber 11. Fibers 11 and 9 are connected to inputs of recombining Y-branch 12. The output of recombining Y-branch 12 is connected to output fiber 13.

The control laser provides its control signal to input fiber 5 whereas the pump laser provides its signal to input fiber 6. Output signals from fiber 13 are coupled to optical filter 14 which provides bandpass filtering of the optical signals. In one example from experimental practice, laser 1 includes a standard low power semiconductor laser such as Group III-V laser (AlGaAs/GaAs or InGaAsP/InP or the like) operating at a frequency $\omega_0 - 2\pi f$. Laser 2 includes a higher power laser such as a color center laser or other high power solid state laser operating at a frequency $\omega_0$. Bandpass filtering occurs about frequency $\omega_0$. For the experimental arrangement using the modulation instability-based fiber interferometer switch, pump pulse from a color center laser were gated through the switch by a weak cw light signal from a semiconductor laser. The color center laser pump signals at about 3W entered both arms of the balanced interferometer. The phases of the arms were adjusted to obtain a nulled or zero output with only this signal present. When the semiconductor laser signal at greater than 4HW was injected into one arm of the interferometer, modulation instability resulted and destroyed the output null by severely distorting the signals in that arm of the interferometer.

This can be understood as follows. When two signals propagate in a fiber at frequencies $\omega_0$ and $\omega_0 - 2\pi$ for example, the pump and control signals, an amplitude modulation occurs at beat frequency f, where f is much less than the pump signal frequency $\omega_0$. This amplitude modulation leads to a phase modulation of the signals via the intensity dependent index $\delta n = n_2 I$. If the signals are at frequencies in the anomalous group velocity dispersion region and the pump signal is sufficiently intense, then the field in each modulation period undergoes compression as described above to develop into a narrow soliton pulse. The initial growth of the signal excited in the lower sideband is given by:

$$P(\omega_0 - 2\pi f) = P_0 \left\{ 1 + \left[ \frac{A^2}{\gamma} \sinh(\gamma l / Z_c) \right]^2 \right\}, \quad (1)$$

$$\gamma = \Omega [A^2 - (\Omega/2)^2]^{\frac{1}{2}},$$

where $\Omega = 2\pi f \tau_c, Z_c = 2\pi c \tau_c^2/(\lambda_0^2 |D|)$, $P_c = \lambda_0 A_{eff}/(2\pi n_2 Z_c)$, $A = \sqrt{P_p/P_c}$, and $P_p$ is the pump power. Note that one of three normalizations $\tau_c$, $Z_c$, $P_c$ can be chosen arbitrarily. For typical numbers in our experiments ($\lambda_0 = 1.53\mu m$, $|D| = 4.13$ psec/nm/km, $A_{eff} = 2.6 \times 10^{-7} cm^2, n_2 = 3.2 \times 10^{-16} cm^2/W, P_p \sim 3W, f = 280$ GHz, and $l = 600$ m) $2\gamma l/Z_c \sim 15.8$, which would mean a gain of $2.87 \times 10^6$. However, the gain saturates below $10^6$ in our experiments because of pump depletion and the soliton self-frequency shift.

A fiber Mach-Zehnder interferometer desensitizes the output to fluctuations in the pump, while providing a sensitive measure of amplitude and phase changes in a single arm. Modulation instability induced in only one arm of the interferometer, and the difference output $\frac{1}{2}|u_1 - u_2|^2$ is monitored, where $u_1$ and $u_2$ are the electric field in each arm. The interferometer enhances the gain from modulation instability since the output includes not only the power in the various sidebands but also a large fraction of the pump power because of depletion and phase changes in the pump.

Figure 2:
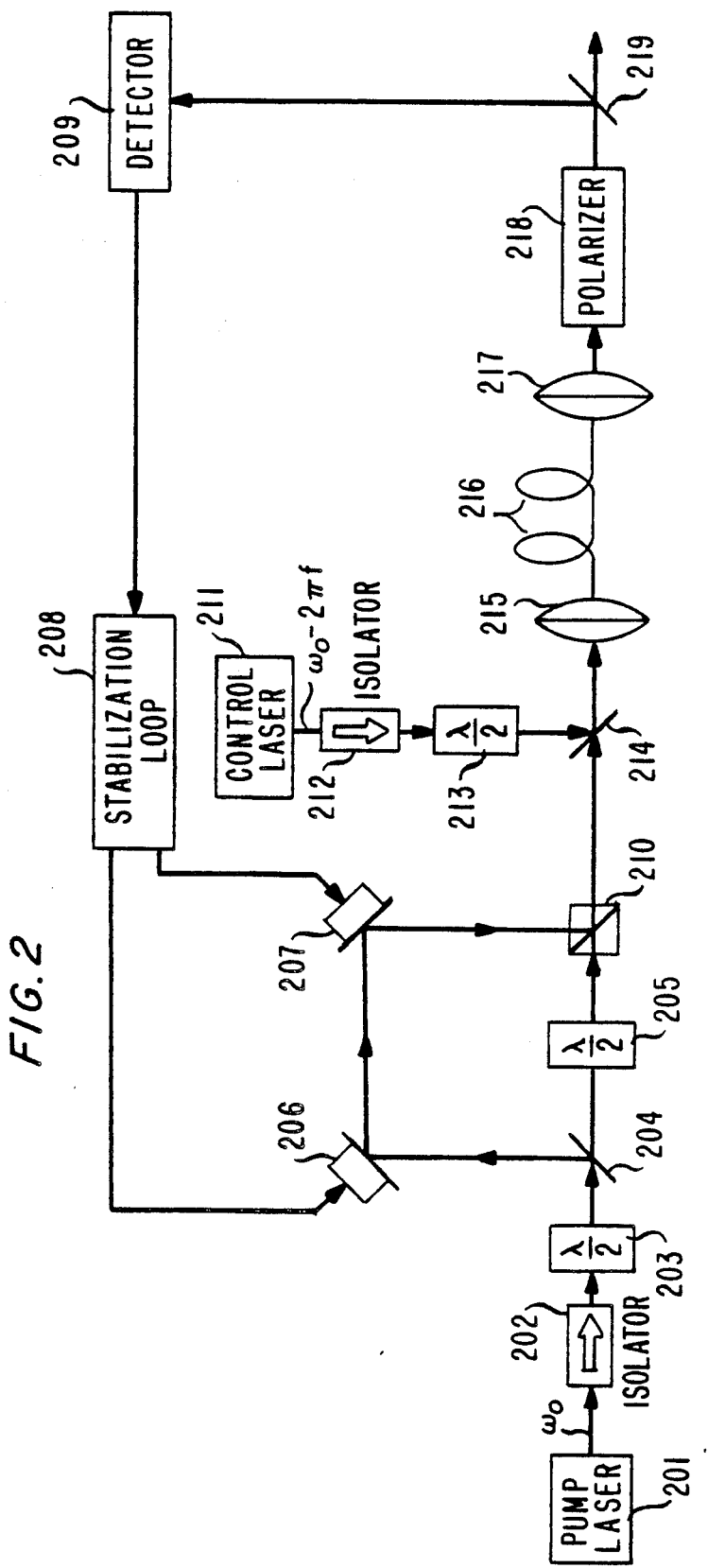

In another example from experimental practice, the two arms of the MACH-Zehnder interferometer correspond to the two orthogonal axes of a single-mode, polarization-preserving, dispersion shifted fiber (FIG. 2). The fiber is 600 m long with a dispersion zero at 1.415 $\mu m$ and a loss of 0.36 dB/km at 1.53 $\mu m$. Since the beat length is only $\sim 8$-10 mm, a perturbation along one axis generally does not disrupt the field along the orthogonal axis.

In this example as shown in FIG. 2, pump laser 201 generates a pump signal at frequency $\omega_0$. The pump signal is isolator 202 from back reflections generated by the remaining parts of the arrangement. Polarization rotation of 90° is accomplished on the pump signal by element 203. Beam splitter 204 divides the pump signal into a straight-through path and a delay path. The straight-through path includes a 90° polarization rotation element 205; the delay path includes piezo-electrically controllable corner reflectors 206 and 207 which determine the overall delay of the path to insure that the orthogonal polarizations in the fiber which undergo different propagation constants coincide properly at the interferometer output. Control of the piezo-electrically controlled corner reflectors is accomplished separately from a stabilization control element 208 which receives the detected output from photodetector 209. The straight-through and delay paths recombine in polarization beam splitter 210. The control signal at frequency $\omega_0 - 2\mu f$ is generated by control laser 211. The control signal is isolated by isolator 212 from back reflections generated by the remaining parts of the arrangement. Polarization rotation of 90° is accomplished on the control signal by element 213. Beam splitter 214 combines the orthogonal polarizations of the pump signal with the single polarization of the control signal. Lens 215 focuses the combined signals onto single-mode, polarization-preserving, dispersion shifted fiber 216. The fiber output is focussed onto polarizer 218 by lens 217. Polarizer 218 analyzes the fiber output is set for a null together with the delay path when the control signal is absent. A Michelson interferometer may be employed for polarizer 218. Beam splitter 219 provides for feedback of the polarizer output to the stabilization loop.

As stated above the two orthogonal polarizations "walk off" from each other because of the birefringence of the fiber. For a birefringence $\delta n \approx 10^{-4}$, the walk off over one kilometer of fiber will be approximately $\delta\tau = l\delta n/c = 333$psec. Because of the walk off, it is desirable for the control laser to inject the control signal into the fiber in a polarization parallel to or in the paper. The delay path is adjusted to correct the phase of the signals so that the polarizations out of and in the paper meet properly at the polarizer 218.

Dispersion shifted fibers are desirable for the arrangement above because the fundamental soliton power is low and because the walk off between the control and pump signals can be made to be on the order of psec.

A Tl$^0$(1):KCl color center laser provides the 1.53 $\mu$m pump pulses. A pure CW pump signal is not used because of power requirements and to avoid backward stimulated Brillouin scattering. An etalon in the color center laser broadens the pulses to $\tau > 50$psec (since $\tau >> 1/f$, this serves as a quasi-cw pump). The color center laser output is split into two equal parts, and one arm's polarization is rotated by 90° degrees. Since the indices in the two axes of the fiber are different, we use a delay stage to make the pump pulses coincident at the end of the fiber. After the two beams are combined using a polarizing beam splitting, another beam splitter couples in the control signal or perturbation field from a single-mode, distributed feedback semiconductor laser with asymmetric coating. The frequency of the semiconductor laser is shifted $\sim 300$ GHz from the color center laser center wavelength, and the frequency separation can be varied by temperature tuning the semiconductor laser. The resulting laser beams are coupled into the polarization preserving fiber. A polarizer analyzes the fiber output and is set for a null when the control signal is absent. The maximum transmission of the polarizer is only about 20%. Hence, for an ideal polarizer, the switched output would be five times larger than the value measured herein. In addition, a part of the nulled output serves as an error signal to a feedback loop to stabilize the interferometer against thermal drifts in the birefringence. The temporal and spectral behavior of the output are monitored using a nonlinear autocorrelator, a scanning Fabry-Perot, and a spectrometer.

Figure 5:
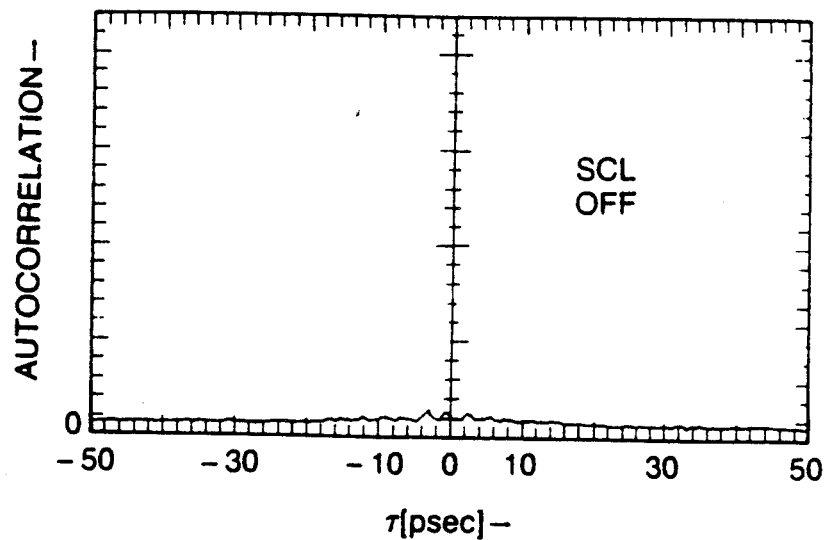
Figure 6:
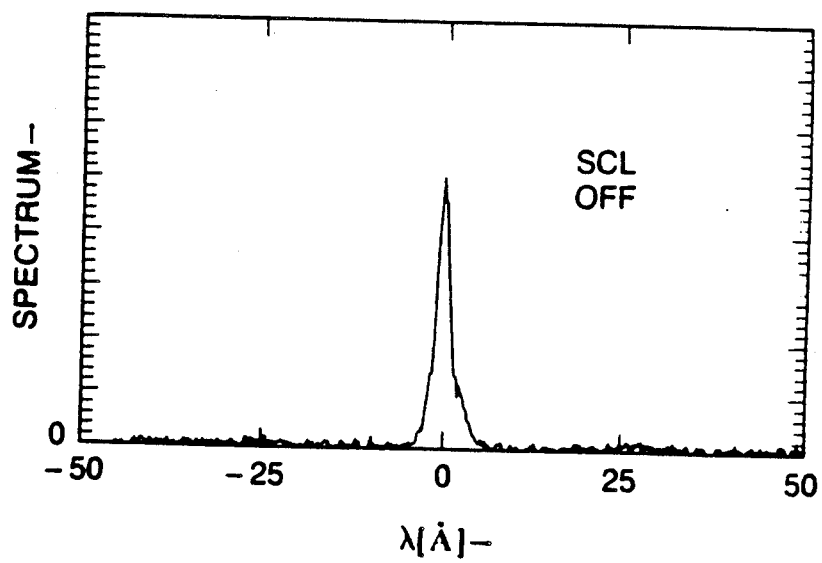

When the interferometer is balanced and nulled with $\sim 3.5$W of peak pump power in each arm, then the autocorrelation of FIG. 5 and the spectrum of FIG. 6 emerge after the polarizer. Although the broad pump pulse gives a low autocorrelation signal, the leakage is clear from the spectrum. The leakage power could be reduced by improving the temporal and spatial overlap at the analyzer and by using better polarizers. As long as the pump is a pulsed signal, the pulse shaping should be substantially identical in each arm (polarization) suggesting that fibers be chosen with substantially identical group velocity dispersion characteristics for both axes or the arrangement of FIG. 1 be employed.

Figure 3:
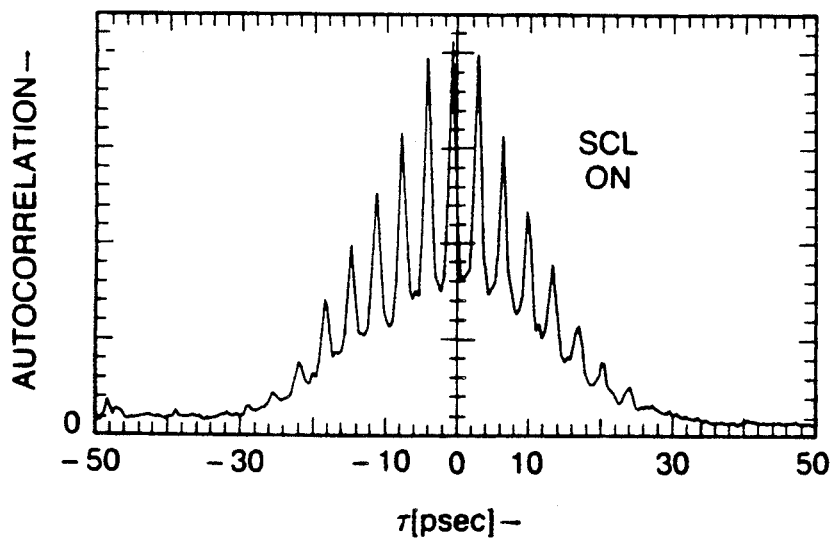
FIGS. 3 through 6 show plots of the autocorrelation and the spectrum for a modulation instability-based fiber interferometer switch output in the presence and absence of an applied control signal in accordance with the principles of the invention.
Figure 4:
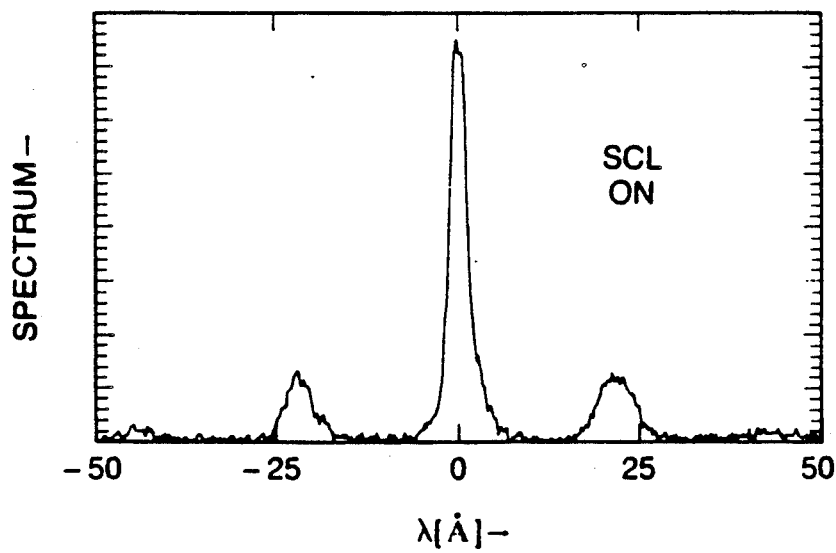

When 4.4 $\mu$W of control signal power at 280 GHz below the pump frequency is injected into one polarization of the fiber, modulation instability causes the autocorrelation (FIG. 3) and spectrum (FIG. 4) to change dramatically. The net gain at the fiber device output is $\sim 4 \times 10^4$ ("gain" being defined as the ratio of the peak power at the fiber device output to the control signal input power, $G(\omega) = P_{out}(\omega)/P_{in}(\omega_0 - 2\pi f)$), while the device gains at the various frequencies are $G(\omega_0) = 1.7 \times 10^4$, $G(\omega_0 - 2\pi f) = 10^4$, and $G(\omega_0 + 2\pi f) = 8.1 \times 10^3$. Despite these high gains, the on:off contrast ratio is only $\sim 3:1$ because of the pump leakage. The change in autocorrelation $G_2(\tau)$ is more pronounced than the spectral change because $G_2(\tau)$ is proportional to intensity squared rather than energy, and because the second harmonic process is strongly polarization sensitive.

The power output and contrast ratio improve when higher control signal powers are used. For example, with $\sim 3$ W of color center laser (pump) power in each arm and 58 $\mu$W of semiconductor laser (control) power (f = 275 GHz), the measured gains are $G(\omega_0) = 4 \times 10^3$, $G(\omega_0 - 2\pi f) = 640$, and $G(\omega_0 + 2\pi f) = 380$. The asymmetry between the upper and lower sidebands is attributable to Raman amplification or the soliton self-frequency shift. Although the gains are lower, the net output power is almost a factor of two larger than in the previous case and the contrast ratio is better than 5:1.

In order to operate the switch as a single frequency device, it is contemplated that the control laser be injection locked. It is possible to fabricate a control laser such as a standard semiconductor laser so that the detuning frequency f is within the locking bandwidth of the laser. If no signal is injected, the control laser would operate at the frequency $\omega_0 - 2\pi f$ causing modulation instability and an output from the switch. On the other hand, if a signal at frequency $\omega_0$ were injected into the control laser, the control laser would shift its output frequency to $\omega_0$ which is equal to the pump frequency. As a result, the switch output disappears. Even though the signal power injected into the one arm of the interferometer exceeds the power in the other arm by a some amount, the amount is insignificant and can be disregarded as it will not affect switch operation. This device is characterized as being normally on and acts as an inverting switch. The incremental gain in this arrangement is increased over the arrangements discussed above because it comes from two sources, namely, from modulation instability and from the gain from injection-locking the control laser.

It should be noted that the amount of frequency detuning between the control signal frequency and the pump frequency can be determined from the spatial growth rate $\gamma$ for modulation instability in which:

$$\gamma = \frac{2\pi\lambda_0^2}{c} |D| f \sqrt{2f_{max}^2 - f^2} .$$

In order for spatial growth to occur, it is necessary that the frequency detuning be in the range $$0 < f < \sqrt{2f_{max}}$$

where $$f_{max} = \frac{A}{\sqrt{2\pi}} \left( \frac{1.76}{\tau} \right).$$

Note that the maximum growth rate is given by $$\gamma_{max} = 2\pi \frac{\lambda_o^2}{c} |D| f_{max}^2.$$

It should be clear to those skilled in the art that the bandpass filter element shown in FIG. 1 may be realized by a diffraction grating element such as a fiber grating coupler (co-directional or contra-directional) or the like. For such a realization, the Bragg wavelength of the grating would be chosen to cover the range of frequencies including the pump signal frequency $\omega_0$. Particularly, the Bragg wavelength would be desirably set equal to the pump signal frequency.

Power considerations for the switch permit lower power operation without degrading performance. Such considerations include the use of longer lengths of optical fiber in the intermediate waveguide so that the interaction length for the signals is increased for lower input signal (control and pump) powers. Also, the use of optical fibers having a larger nonlinear index permits a corresponding decrease in the input signal (control and pump) powers.

While it should now be clear to those skilled in the art, the gain of the modulation instability-based fiber interferometric switch is unidirectional and approximates an exponential function until saturation is reached. The loss for the switch appears to be linear.

I claim:

1. An optical switch comprising
   an input for a control signal,
   an input for a pump signal,
   an intermediate waveguide means having first and second separate paths for supporting optical signal transmission on each of said paths,
   means for coupling said pump signal input to each of said first and second paths,
   means for coupling said control signal input to said first path,
   means for combining said first and second optical paths into an output for producing an output signal having first and second states, wherein modulation instability is caused to occur in said first path in the presence of said control signal to produce said output signal in said first state and wherein said output signal is produced in said second state in the absence of said control signal.

2. The optical switch as defined in claim 1 wherein said intermediate waveguide means includes first and second optical fibers corresponding to said first and second separate paths, respectively.

3. The optical switch as defined in claim 2 wherein said output signal input is coupled to an optical filter means, said optical filter means for transmitting a portion of said output signal over the frequency range in the vicinity of the pump signal frequency.

4. The optical switch as defined in claim 3 wherein said optical filter means includes a diffraction grating element having a Bragg wavelength substantially equal to said pump signal frequency.

5. The optical switch as defined in claim 1 wherein said intermediate waveguide means includes a polarization preserving optical fiber for supporting propagation of first and second optical signal polarizations therein corresponding to said first and second separate paths, respectively.

6. The optical switch as defined in claim 5 wherein said means for coupling said pump signal input includes a polarization means for splitting said pump signal into first and second substantially orthogonal polarizations.

7. The optical switch as defined in claim 6 wherein said means for coupling said pump signal input includes means for introducing a predetermined time delay in said first polarization of the pump signal with respect to the second polarization of the pump signal, said time delay introducing means coupled between said polarization means and said intermediate waveguide means.

8. The optical switch as defined in claim 7 wherein said means for combining includes a polarization analyzer means.

9. An optical switch comprising
   an input for a control signal,
   an input for a pump signal,
   an intermediate waveguide means having first and second separate paths for supporting optical signal transmission on each of said paths,
   means for coupling said pump signal input to each of said first and second paths,
   means for coupling said control signal input to said first path,
   means for combining said first and second optical paths into an output for producing an output signal having first and second states, wherein modulation instability is caused to occur in said first path to produce said output signal in said first state when said control and pump signals have respective frequencies offset from each other by a predetermined amount and wherein said modulation instability is inhibited to produce said output signal in said second state when said control and pump signals have substantially equal respective frequencies.

10. The optical switch as defined in claim 9 wherein said intermediate waveguide means includes first and second optical fibers corresponding to said first and second separate paths, respectively.

11. The optical switch as defined in claim 10 wherein said output is coupled to an optical filter means, said optical filter means for transmitting a portion of said output signal over the frequency range in the vicinity of the pump signal frequency.

12. The optical switch as defined in claim 11 wherein said optical filter means includes a diffraction grating element having a Bragg wavelength substantially equal to said pump signal frequency.

13. The optical switch as defined in claim 9 wherein said intermediate waveguide means includes a polarization preserving optical fiber for supporting propagation of first and second optical signal polarizations therein corresponding to said first and second separate paths, respectively.

14. The optical switch as defined in claim 13 wherein said means for coupling said pump signal input includes a polarization means for splitting said pump signal into first and second substantially orthogonal polarizations.

15. The optical switch as defined in claim 14 wherein said means for coupling said pump signal input includes means for introducing a predetermined time delay in said first polarization of the pump signal with respect to the second polarization of the pump signal, said time delay introducing means coupled between said polarization means and said intermediate waveguide means.

16. The optical switch as defined in claim 15 wherein said means for combining includes a polarization analyzer means.

* * * * *